Dec. 16, 1969　　R. A. HARVEY ET AL　　3,483,701
GAS TURBINE COMBUSTION EQUIPMENT
Filed Jan. 29, 1968　　2 Sheets-Sheet 1
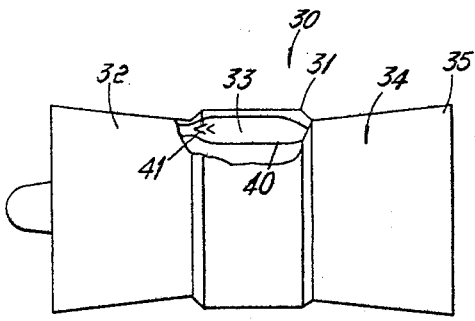
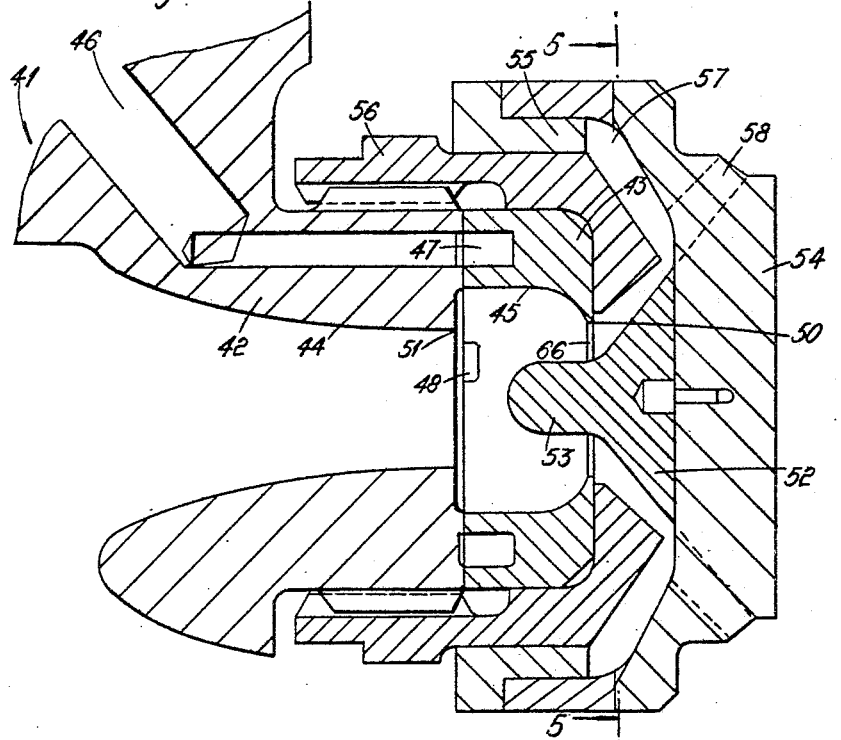
Inventors
Richard Alfred Harvey
Keith Gradon
John Chantry
By Cushman, Darby & Cushman
Attorneys

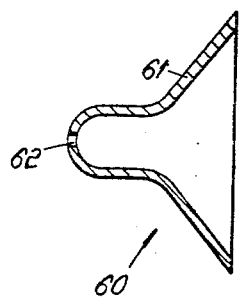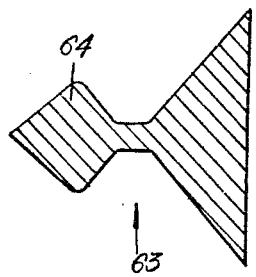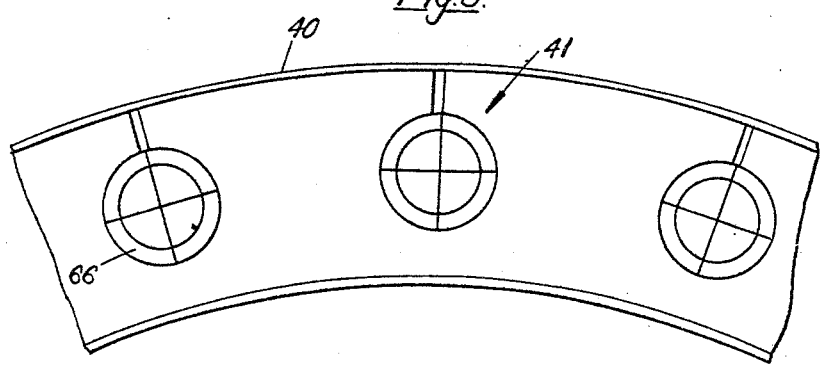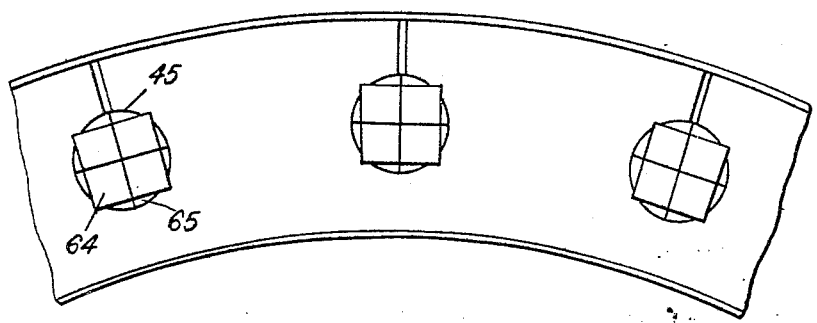

United States Patent Office 3,483,701
Patented Dec. 16, 1969

3,483,701
GAS TURBINE COMBUSTION EQUIPMENT
Richard Alfred Harvey and Keith Gradon, Derby, and John Alfred Chantry, Ashby-de-la-Zouch, England, assignors to Rolls-Royce Limited, Derby, England, a British company
Filed Jan. 29, 1968, Ser. No. 701,226
Claims priority, application Great Britain, Mar. 20, 1967, 8,539/67
Int. Cl. F02g 1/00, 3/00, 1/06
U.S. Cl. 60—39.74                                    9 Claims

ABSTRACT OF THE DISCLOSURE

A gas turbine combustion equipment comprises a fuel injector having a hollow central body, the interior of which is supplied with compressed air, means supplying fuel tangentially to the interior of the central body, and a deflector for deflecting the fuel/air mixture in a radially outward direction, the deflector being mounted on an end piece with outlet passages therein, the end piece forming a compressed air flow passage with the central body such that the fuel/air mixture issuing from within the central body is mixed with compressed air from the flow passage before passing through the outlet passages.

---

This invention concerns a gas turbine engine combustion equipment.

According to the present invention, there is provided a gas turbine engine combustion equipment comprising a flame tube, a fuel injector, which includes a hollow central body, the interior of which is adapted to be supplied with compressed air, fuel supply means for supplying fuel to the internal surface of the central body to form an annulus of fuel flowing downstream therein, and a conical member which defines between itself and the central body a generally radially outwardly directed first flow passage, an apertured end piece which is secured to said conical member, extends substantially radially across the first flow passage and defines between itself and the upstream end of the central body a second flow passage which is at an acute angle with the first flow passage and which is adapted to be supplied with compressed air, whereby, in operation, the fuel/air mixture issuing from the first flow passage is mixed with the compressed air issuing from the second flow passage before passing through the apertured end piece.

Preferably the downstream end of the internal surface of said central body is formed with an edge at which fuel is detached from said internal surface.

The internal surface of said central body, upstream of the portion thereof over which the fuel flows, is preferably formed with an inwardly directed lip.

Means may be provided for relieving the low pressure area immediately downstream of the conical member. Thus the conical member may be hollow and may have a wall which is provided with an aperture at its upstream end.

There may also be additional deflecting means for deflecting compressed air into the annulus of fuel upstream of the said edge to improve mixing of the said air and fuel. Thus the conical member may have a bulge at its upstream end, which bulge constitutes the said additional deflecting means.

The bulge may bee so shaped and situated with regard to the said internal surface as to produce a plurality of sector-shaped streams of fuel-containing air.

The fuel supply means preferably direct the fuel tangentially to the said internal surface. Thus the fuel supply means may comprise a fuel feed annulus arranged about the said internal surface, and a plurality of passages leading tangentially therefrom and extending tangentially to the said internal surface.

The invention also comprises a gas turbine engine combustion chamber provided with at least one fuel injector as set forth above.

The invention is illustrated, merely by way of example, in the accompanying drawings, in which:

FIGURE 1 is a diagrammatic view, partly in section, of a gas turbine engine provided with fuel injectors in accordance with the present invention, FIGURE 2 is a sectional view of such a fuel injector, FIGURES 3 and 4 are sectional views illustrating modifications of the fuel injector of FIGURE 2, FIGURE 5 is a diagrammatic view taken on the line 5—5 of FIGURE 2, and FIGURE 6 is a view similar to FIGURE 5 but illustrating a modification.

In FIGURE 1 there is shown a gas turbine engine 30 having an outer casing 31 within which there are mounted, in flow series, one or more compressors 32, combustion equipment 33, one or more turbines 34 and an exhaust assembly 35.

The gas turbine engine 30 has a single annular flame tube 40 (see FIGURE 5) and may have fuel injectors 41 as shown in FIGURE 2.

Each fuel injector 41 comprises a hollow body having parts 42, 43 provided with internal surfaces 44, 45 respectively. A fuel supply conduit 46 extends through the part 42 so as to lead fuel to a fuel feed annulus 47 in the part 43, the fuel feed annulus 47 being arranged about the internal surface 45. A plurality of passages 48 lead tangentially from the fuel feed annulus 47 and extend tangentially to the internal surface 45. The fuel is thus directed tangentially to the internal surface 45 and forms an annulus of fuel which flows downstream therein.

The internal surface 45 is provided at its downstream end with an edge 50. Compressed air from the compressor 12 is supplied to the interior of the internal surfaces 44, 45 and thus to the interior of the annulus of fuel flowing downstream over the internal surface 45. At the edge 50, the fuel is detached therefrom by the flow of compressed air for entrainment with the latter.

The internal surface formed collectively by the surfaces 44, 45 is formed with an inwardly directed lip 51 which is disposed immediately upstream of the surface 45 over which the fuel flows.

Mounted to extend through the downstream end of the part 43 is a conical member 52 which deflects the flow of compressed air, having fuel entrained therewith, radially outwardly of the downstream end of the internal surface 45. As will be seen, the conical member 52 has an axial extension 53 at its upstream end which extends for a substantial distance into the part 43.

The conical member 52 is carried by an end piece 54 which is mounted by way of struts 55 on a nut 56 connected to the part 42. An annular flow passage 57 is thus provided between the end piece 54 and the nut 56 for directing a flow of compressed air towards the conical member 52.

The end piece 54 has passages 58 extending therethrough for the passage of the atomised fuel therethrough.

In operation, compressed air flows through the interior of the parts 42, 43 so as to pass through the interior of the annulus of fuel which swirls over the internal surface 45. This flow of compressed air will thus detach the fuel, as a thin conical sheet, from the edge 50 so that this sheet of fuel will be entrained with the compressed air. The sheet of fuel may remain unbroken for a short distance, but as the conical member 52 radially outwardly deflects the air stream and the at least partially atomised fuel, the fuel will gradually mix with the air. This partially atomised fuel will be broken up by the flow of compressed air through the flow passage 57 and will then pass through the passages 58 in the end piece 54. Thus the fuel will be entrained between two air flows which will tend to produce particularly good mixing and efficient atomisation.

The provision of the lip 51 will assist in preventing any tendency of the fuel to dribble upstream.

In FIGURE 3 there is shown a conical member 60 which may be used instead of the conical member 52 of FIGURE 2. The conical member 60, unlike the conical member 52, is a hollow member having a wall 61 whose upstream end has an aperture 62 therethrough, the downstream end of the conical member 60 being open (by means not shown) to the flame tube 40. The provision of the hole 62 relieves the low pressure area immediately downstream of the conical member 60 and thus assists in preventing deposition of carbon from the combustion products at the said upstream end.

In FIGURE 4 there is shown a solid conical member 63 which may be used in replacement for the conical member 52 of the FIGURE 2 construction.

The conical member 63 has a lozenge-shaped bulge 64 at its upstream end. The bulge 64 helps to deflect the compressed air flowing through the interior of the hollow body member 43 so as to direct this compressed air into the annulus of fuel upstream of the edge 50 to improve mixing of the said air and fuel. This is particularly desirable at low turbine speeds where the air flow may not be sufficient to effect sufficient detachment of the fuel from the edge 50.

The bulge 64 is so shaped and situated with respect to its internal surface 45 as to form therewith a plurality of sector-shaped spaces 65 (FIGURE 6) through which may flow sector-shaped streams of fuel-containing air. This has been found to provide a more satisfactory fuel distribution than is provided by the fully annular gap 66 (FIGURE 5) between the extension 53 and the edge 50 which thus provides a fully circular spray in the construction shown in FIGURE 5.

We claim:
1. Gas turbine engine combustion equipment comprising a flame tube, a fuel injector which includes a hollow central body, the interior of which is adapted to be supplied with compressed air, fuel supply means for supplying fuel to the internal surface of the central body to form an annulus of fuel flowing downstream therein, and a conical member which defines between itself and the central body a generally radially outwardly directed first flow passage, an apertured end piece which is secured to said conical member, and which extends substantially radially across the first flow passage to define between itself and the upstream end of the central body a second flow passage which is at an acute angle with the first flow passage and which is adapted to be supplied with compressed air, whereby, in operation, the fuel/air mixture issuing from the first flow passage is mixed with the compressed air issuing from the second flow passage before passing through the apertured end piece.

2. Gas turbine combustion equipment as claimed in claim 1 wherein the downstream end of the internal surface of said central body is formed with an edge at which fuel is detached from said internal surface.

3. Gas turbine combustion equipment as claimed in claim 1 wherein the internal surface of said central body, upstream of the portion thereof over which the fuel flows, is formed with an inwardly directed lip.

4. Gas turbine combustion equipment as claimed in claim 1 in which the conical member is hollow and has a wall which is provided with an aperture at its upstream end to prevent the formation of a low pressure area immediately downstream of said conical member.

5. Gas turbine combustion equipment as claimed in claim 2 in which there are additional deflecting means for deflecting compressed air into the annulus of fuel upstream of the said edge to improve mixing of the said air and fuel.

6. Gas turbine combustion equipment as claimed in claim 5 in which the conical member has a bulge at its upstream end, which bulge constitutes the said additional deflecting means.

7. Gas turbine combustion equipment as claimed in claim 6 in which the bulge is so shaped that it and the said internal surface together produce a plurality of sector-shaped streams of fuel-containing air.

8. Gas turbine combustion equipment as claimed in claim 1 in which the fuel supply means direct the fuel tangentially to the said internal surface.

9. Gas turbine combustion equipment as claimed in claim 8 in which the fuel supply means comprise a fuel feed annulus arranged about the said internal surface and a plurality of passages leading tangentially therefrom and extending tangentially to the said internal surface.

References Cited

UNITED STATES PATENTS

| | | | |
|---|---|---|---|
| 2,705,401 | 4/1955 | Allen et al. | 60—39.74 |
| 2,771,744 | 11/1956 | Johnson et al. | 60—39.74 |

MARK NEWMAN, Primary Examiner

DOUGLAS HART, Assistant Examiner